United States Patent [19]

Zimmerman

[11] Patent Number: 5,228,737

[45] Date of Patent: Jul. 20, 1993

[54] VEHICLE TRUNK LID HOLDER

[76] Inventor: Neil L. Zimmerman, 805 12th St., Kenosha, Wis. 53140

[21] Appl. No.: 904,502

[22] Filed: Jun. 25, 1992

[51] Int. Cl.⁵ .................................................. B62D 25/10
[52] U.S. Cl. ...................................... 296/76; 248/231.7; 248/351; 217/61; 292/275; 292/276; 292/339
[58] Field of Search ................... 296/76; 292/275, 276, 292/338, 339; 217/61; 248/351, 231.7

[56] References Cited

U.S. PATENT DOCUMENTS

| | | | |
|---|---|---|---|
| 2,371,451 | 3/1945 | Larson | 248/231.7 |
| 2,452,301 | 10/1948 | Hestor | 248/231.7 |
| 2,528,201 | 10/1950 | White | 248/231.7 |
| 2,920,855 | 1/1960 | Giebel | 248/231.7 |
| 2,974,989 | 3/1961 | Hilbers | 292/339 X |
| 3,117,689 | 1/1964 | Dedic | 217/60 F |
| 3,180,668 | 4/1965 | Brown | 292/276 |
| 3,216,605 | 11/1965 | Hughes | 292/276 X |
| 3,971,589 | 7/1976 | Elrod | 296/76 |
| 3,988,032 | 10/1976 | Weinstein | 296/76 |
| 4,062,583 | 12/1977 | Taylor | 296/76 |
| 4,124,240 | 11/1978 | Adelberg | 292/339 X |
| 4,903,929 | 2/1990 | Hoffman | 248/231.7 X |
| 4,953,820 | 9/1990 | Yoder | 248/231.5 |
| 5,156,365 | 10/1992 | McCaig et al. | 248/231.7 X |
| 5,163,724 | 11/1992 | Conte | 292/339 X |

FOREIGN PATENT DOCUMENTS 0291216 12/1986 Japan ..................................... 296/76

Primary Examiner—Dennis H. Pedder
Attorney, Agent, or Firm—Arthur J. Hansmann

[57] ABSTRACT

A device for holding a vehicle's lid, e.g., an automobile's trunk lid, in a partly-open position to enable an oversized article to be placed inside the vehicle's compartment which would normally be closed by the lid. The holder generally includes an upper lid clamp assembly, a lower body clamp assembly, and a linkage member. The upper lid clamp assembly includes means for pivotally and adjustably attaching the linkage member thereto. The lower body clamp assembly includes means for pivotally and preferably releasably attaching the linkage member thereto.

11 Claims, 4 Drawing Sheets

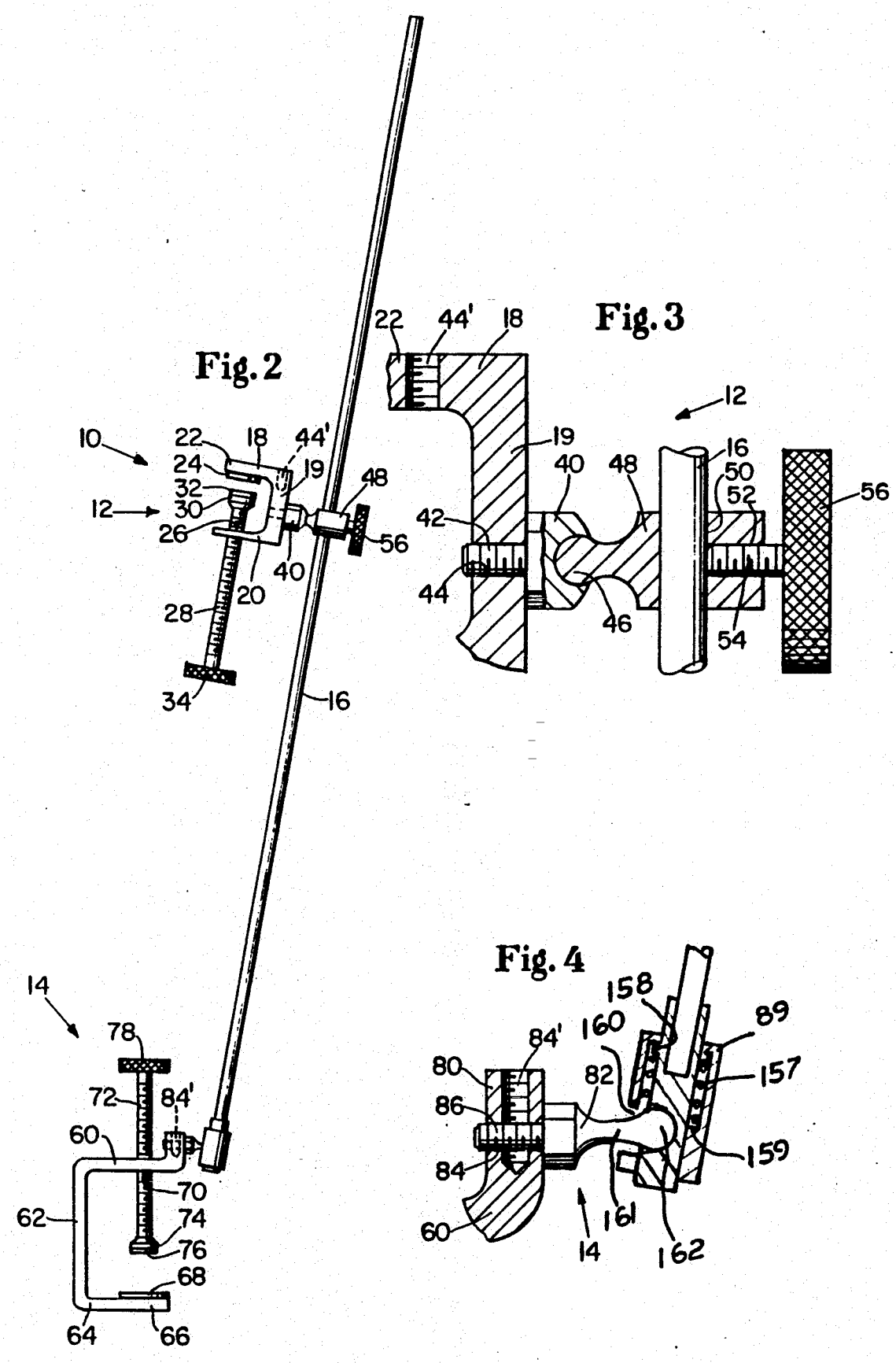

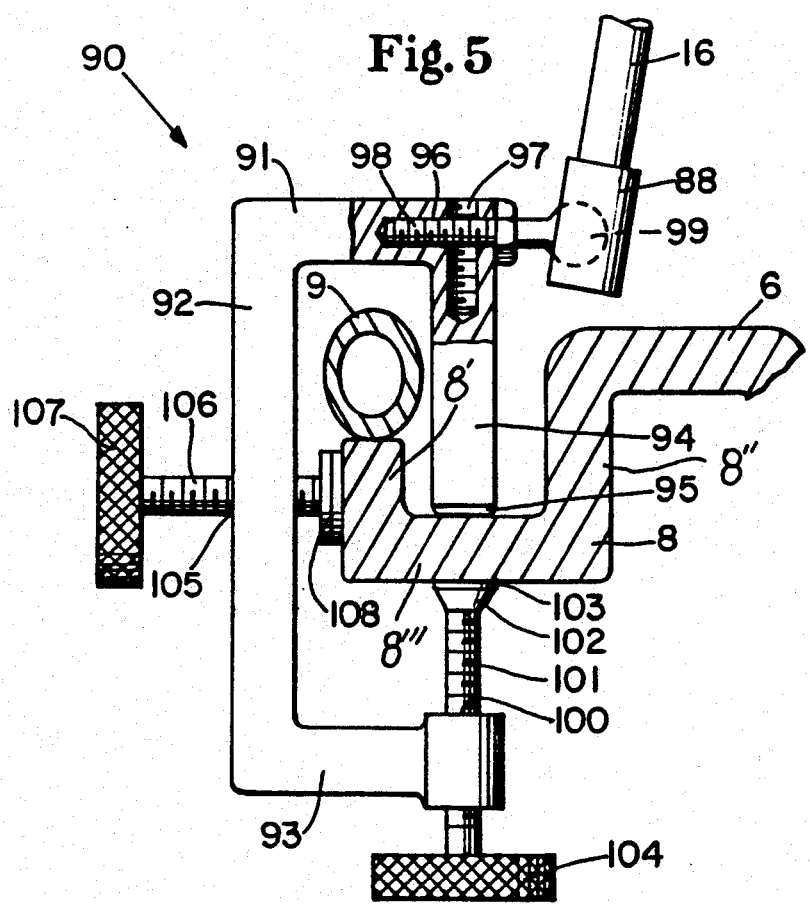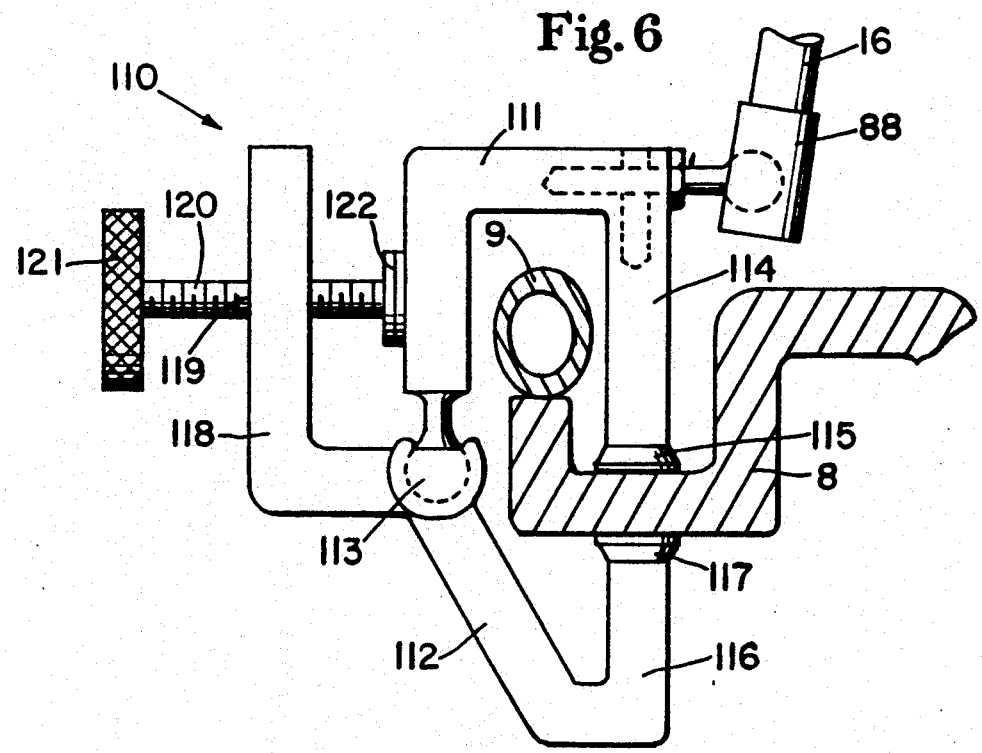

VEHICLE TRUNK LID HOLDER

The present invention relates generally to accessories for vehicles, and more particularly to a device for holding a vehicle's trunk lid in various partly-open positions to accommodate oversized articles in the vehicle's trunk.

BACKGROUND OF THE INVENTION

Virtually everyone who has operated a vehicle has experienced the frustration of trying to close the vehicle's trunk lid when an oversized article, i.e., an article that will not permit the trunk to be fully closed, is placed within the trunk. In recent years, the frequency and magnitude of the problem has increased with the ever increasing use of downsized automobiles that have small trunks. When faced with the problem of transporting a large article, most vehicle operators try to secure the partially-open trunk lid to various members of the vehicle's body portion or bumper with string, twine, rope, metal cables, or elastic bands with hooks at their respective ends, which are commonly referred to as "bungee cords". Most vehicle operators find this crude answer to the problem entirely unsatisfactory because the rope, etc., never seems to be available when needed, and the overall fastening procedure is very time-consuming and frustrating, especially for the elderly and others with limited physical dexterity. In addition, the ropes, knots, etc., inevitably become loose after the vehicle has been driven for even a short distance, which allows the trunk lid to freely bounce up and down and thereby dent, scratch, or otherwise damage both the trunk lid and the article being transported.

Others have recognized the need for a device to secure a vehicle's trunk lid in a partly-open position. For example, in U.S. Pat. Nos. 3,971,589 to Elrod, and 3,988,032 to Weinstein, there are disclosed various devices that all basically rely on a strap, cord, rope, or cable to tie the trunk lid down. However, it has been found that these types of devices that use a flexible tying member generally stretch and flex when the vehicle is in motion, which permits the trunk lid to bounce up and down. In addition, all of the disclosed devices require permanent holes to be drilled in the trunk lid, vehicle body, or both to secure the device to the vehicle with fasteners, which is very time-consuming, requires special tools, and permanently disfigures the vehicle in addition to possibly weakening the vehicle's structural integrity.

Other known hold-open devices include rigid members that in theory solve the trunk bouncing problem, examples of which include U.S. Pat. Nos. 3,117,689 to Dedic and 4,062,583 to Taylor. However, as with the flexible devices discussed above, these rigid-member devices also require holes to be drilled in the vehicle to attach the device to the vehicle with fasteners. In addition, both the Dedic and Taylor devices, and consequently the trunk lid, can only be locked in a limited number of positions. U.S. Pat. Nos. 2,973,217, and 2,974,989, and 3,180,668 also show rigid holders, but they are more complicated and mount differently compared to this invention. Finally, since these prior art devices are mounted inside the trunk compartment, they significantly reduce the amount of usable storage space within the trunk.

In light of the above, a principal object of the present invention is to provide a trunk lid holder that can be attached to a vehicle without drilling holes in or otherwise permanently altering the vehicle.

Another principal object of the present invention is to provide a trunk lid holder that can be quickly and easily attached to a vehicle when needed, and quickly removed and conveniently stored when not in use.

A further object of the present invention is to provide a trunk lid holder that will secure a trunk lid in an infinite number of degrees of openness.

Another object of the present invention is to provide a trunk lid holder that can be removably attached to a vehicle without the need of special tools.

Yet another object of the present invention is to provide a trunk lid holder that will not rattle when in use.

A further object of the present invention is to provide a trunk lid holder that can be secured to the right, left, or rear side of a vehicle's trunk compartment.

Also, the present holder extends vertically and is therefore most secure in attaching to the trunk lid. Also, it requires only one adjustment to establish the amount of lid openness; and it is therefore firm in holding the lid.

Further, a lower clamp extends into the vehicle rain gutter, and is trapped therein against inadvertent release.

Another object of the present invention is to provide a trunk lid hold-open device that can be attached to a vehicle without damaging the vehicle's outer finish.

SUMMARY OF THE INVENTION

The present invention provides a device for holding a vehicle's lid, e.g., an automobile's trunk lid, in a partially-open position to enable an oversized article to be placed in the vehicle's compartment which would normally be closed by the lid. In one embodiment of the present invention, the hold-open device generally includes an upper lid clamp assembly, a lower body clamp assembly, and a linkage member or rod therebetween. The upper lid clamp assembly, which preferably has an overall "C" configuration to accommodate the vehicle's trunk lid, includes an upper foot and a lower foot that can be moved toward one another to firmly grasp the lid therebetween. The upper lid clamp assembly preferably includes a ball/socket arrangement that allows it to be pivotally and slidably attached to the linkage member. The device's lower body clamp assembly, which also preferably has an overall "C" configuration to accommodate a portion of the vehicle's body, is preferably provided with a ball stud that cooperates with a quick-release ball socket attached to the lower end of the linkage rod to allow the two to be pivotally and releasably attached to one another.

BRIEF DESCRIPTION OF THE DRAWINGS

While the specification concludes with claims that particularly point out and distinctly claim the subject matter regarded as forming the present invention, it is believed that the invention will be better understood from the following detailed description with reference to the drawings in which:

FIG. 2 is a side view of the device of the present invention;

FIG. 3 is an enlarged partial cross-sectional side view of the top lid clamp component of the present invention;

FIG. 4 is an enlarged partial cross-sectional side view of the bottom body clamp component of the present invention;

FIG. 5 is a side elevation view of another preferred embodiment of a lower body clamp assembly of the present invention shown attached to the body of a vehicle;

FIG. 6 is a side elevation view of another preferred embodiment of a lower body clamp assembly of the present invention shown attached to the body of a vehicle;

DETAILED DESCRIPTION OF THE INVENTION

It should be noted that although the following detailed description is specifically directed to a device for holding an automobile trunk lid in a partially-open position, it is to be understood that the present invention may be applied with equal facility in holding open other hinged vehicle panels such as hoods, doors, glove boxes, rear hatches, tailgates, sunroofs, etc. Accordingly, the term "lid" is intended to fully embrace such hinged vehicle panels. In addition, the term "vehicle" is intended to broadly include all types of motorized and unmotorized vehicles such as automobiles including hatchbacks, trucks, vans, minivans, campers, boats, trailers, and the like. Finally, the term "trunk" is intended to broadly include any compartment in a vehicle such as the luggage, engine, or passenger compartment.

Figure 1:
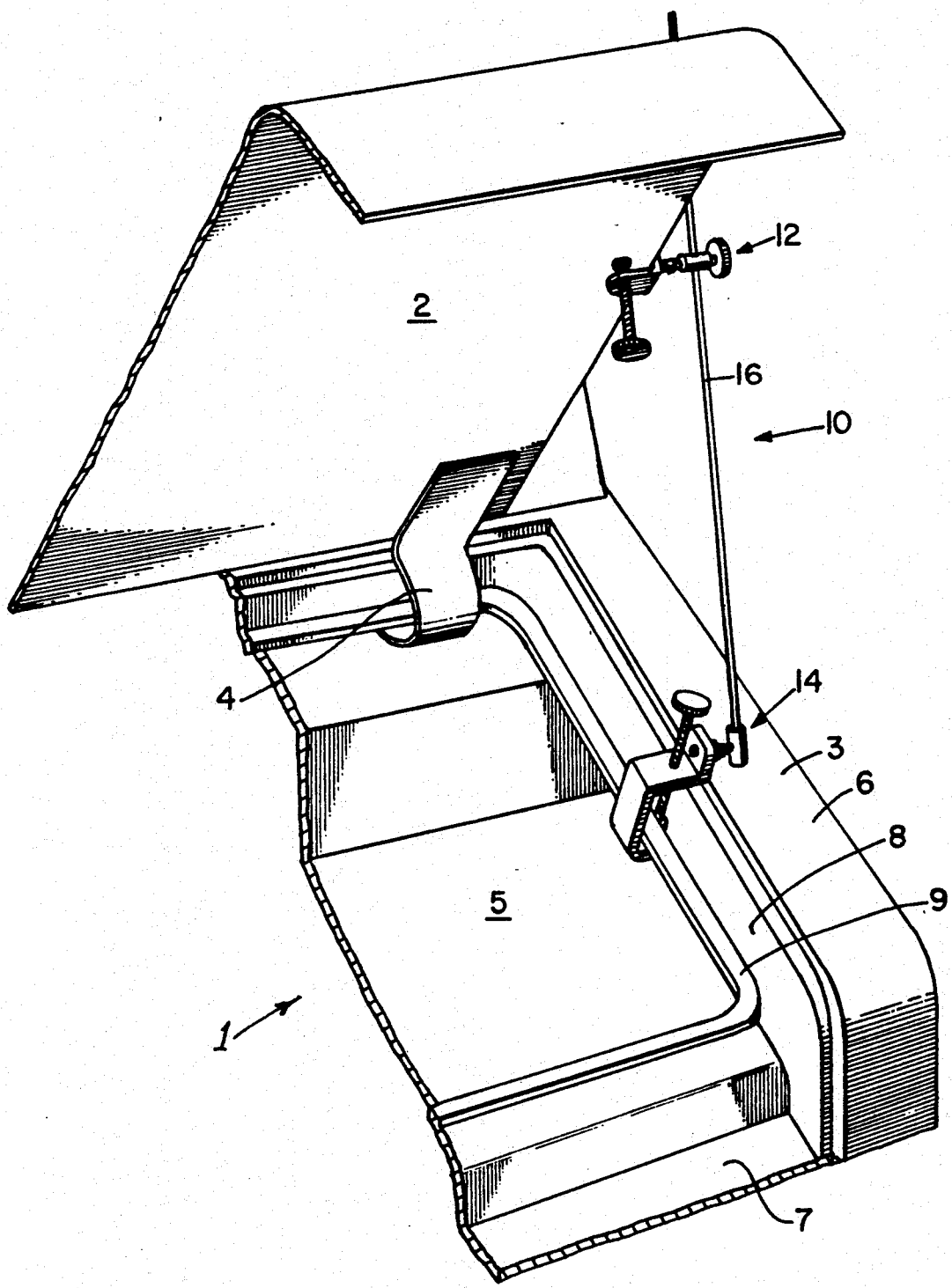
FIG. 1 is a partial elevated perspective view of the rear portion of a vehicle shown with its trunk lid partially open and with the present invention in use.

With reference to the drawings wherein the same numeral is used to indicate common device and application components, FIG. 1 shows the rear portion of a vehicle generally indicated as 1 with the trunk lid hold-open device of the present invention, generally indicated as 10, in place thereon. Vehicle 1 includes trunk lid 2 that is hingedly attached to vehicle body 3 with hinge 4. Vehicle body 3 generally includes trunk or luggage compartment 5, side fender 6, and rear panel 7. A trough or "rain gutter" 8 typically surrounds the upper perimeter edge of trunk 5 and commonly includes resilient gasket 9 which seals trunk compartment 5 when trunk lid 2 is in its fully-closed position.

Referring now to FIGS. 1 and 2, trunk lid hold-open device 10 includes upper lid clamp assembly generally indicated as 12, lower body clamp assembly generally indicated as 14, and linkage member or rod 16, all of which being capable of being made from a wide variety of materials such as various plastics, fiberglass, steel, aluminum, or nylon, etc. Upper lid clamp assembly 12 includes upper arm 18, middle portion 19, and lower arm 20 that together are preferably of one-piece construction in a "C" configuration to accommodate trunk lid 2 between upper arm 18 and lower arm 20. Upper arm 18 terminates with upper foot 22 that preferably has resilient pad 24 attached, e.g. glued, to its inner lid-contacting surface to protect the paint or finish on the outer surface of trunk lid 2 when upper lid clamp assembly is secured thereto. In addition to being resilient, the material from which pad 24 is made preferably has a high coefficient of friction so that upper foot 22 will not readily slip or otherwise move when upper lid clamp assembly 12 is secured to trunk lid 2.

Lower arm 20 of upper lid clamp assembly 12 includes threaded hole 26 through which threaded stud 28 passes. Lower foot 30, which preferably has resilient, no-skid pad 32 attached to its upper surface, is attached to the upper end of threaded stud 28. Handle 34, which is preferably provided with a knurled outer surface, is attached to the lower end of threaded stud 28.

Referring now to FIG. 3 in conjunction with FIG. 2, ball socket 40 is attached, e.g. with threaded stud 42 and threaded hole 44 as shown, to middle portion 19 of upper lid clamp assembly 12. Ball socket 40 rotatably receives ball stud 46 whose body portion 48 is provided with vertical smooth aperture 50 through which linkage rod 16 can freely slide. Body portion 48 of ball stud 46 is also provided with horizontal threaded aperture 52 which receives threaded stud 54. Handle 56, which is preferably provided with a knurled outer surface, is attached to the outer end of threaded stud 54. Ball socket 40/ball stud 46 arrangement is available from Tourek Ball Joints, type "DC" Style 1; or from Superior Linkage Division of the Tuthill Corporation, New Haven, Ind. 46774 USA.

Referring again to FIGS. 1 and 2, lower body clamp assembly 14 includes upper arm 60, middle portion 62, and lower arm 64 that together are preferably of one-piece construction in a "C" configuration. Lower arm 64 includes lower foot 66 that preferably has resilient, no-skid pad 68 attached to its inner surface to protect the paint or finish of side fender 6 or rear panel 7 when lower body clamp assembly 14 is secured thereto.

Upper arm 60 of lower body clamp assembly 14 includes threaded hole 70 through which threaded stud 72 passes. Upper foot 74, which preferably has resilient, no-skid pad 76 attached to its lower surface, is attached to the lower end of threaded stud 72. Handle 78, which is preferably provided with a knurled outer surface, is attached to the upper end of threaded stud 72.

Referring now to FIG. 4 in conjunction with FIG. 2, upper arm 60 of lower body clamp assembly 14 includes vertical flange 80 that has ball stud 82 attached thereto by means of, for example, threaded hole 84 in flange 80 and threaded stud 86. Quick-release ball socket 88, which includes spring-loaded outer sleeve 89, is attached to the lower end of linkage rod 16 and releasably engages ball stud 82. Quick release ball socket 88/ball stud 82 arrangement is available from Tourek Ball Joints, type "S", style 1.

In operation and with reference to FIGS. 1-4, trunk lid hold-open device 10 of the present invention is attached to vehicle 1 by first lifting spring-loaded sleeve 89 of quick-release ball socket 88 which releases linkage rod 16 from lower body clamp assembly 14. Lower body clamp assembly 14 is then attached to vehicle body 3 at, for example, the location shown in FIG. 1 by unscrewing threaded stud 72 by rotating handle 78 in the counterclockwise direction until lower foot 66 and upper foot 74 are spaced sufficiently apart from one another to accommodate the portion of vehicle body 3, e.g. rain-gutter 8, to which lower body clamp assembly 14 is to be attached. Once vehicle body 3 is properly positioned between lower foot 66 and upper foot 74 of lower body clamp assembly 14, threaded stud 72 is rotated clockwise with handle 78, which moves lower foot 66 and upper foot 74 toward one another until vehicle body 3 is firmly squeezed between lower foot 66 and upper foot 74. In similar fashion, upper lid clamp assembly 12 is secured to trunk lid 2 such that lid 2 is squeezed between upper foot 22 and lower foot 30. It should be noted, of course, that the order of attaching clamp assemblies 12 and 14 to the vehicle can be reversed.

After upper lid clamp assembly 12 has been secured to vehicle lid 2 and lower body clamp assembly 14 has been secured to vehicle body 3, linkage member 16 is secured to clamp assemblies 12 and 14 in whatever order is most convenient. In one method, for example, linkage member 16 is first made to slide freely within aperture 50 in body portion 48 of ball stud 46 by turning handle 56 in a counterclockwise direction which partially unscrews threaded stud 54 from threaded horizontal aperture 52. Linkage member 16 is then drawn downwardly or upwardly through body portion 48 of ball stud 46 until quick release ball socket 88 at the lower end of linkage member 16 can be snapped on to ball stud 82 projecting from lower body clamp assembly 14. Finally, trunk lid 2 is lowered to its desired partially-open position, which normally will be near but not touching the oversized article in trunk compartment 5, and locked in this position by turning handle 56 in a clockwise direction, which advances threaded stud 54 in threaded aperture 52 such that the end of threaded stud 54 comes into contact with and tightly squeezes linkage member 16. It is particularly significant that this entire procedure can be done quickly and easily and without having to use any tools.

It should be noted that linkage rod 16 may be permanently rotatably attached to lower body clamp assembly 14 rather than releasably attached thereto as with previously-described ball socket 88/ball stud 82 arrangement. However, the preferred embodiment of the present invention includes this quick-release mechanism to enable the vehicle operator to quickly disengage linkage rod 16 from lower body clamp assembly 14 and open trunk lid 2 to its fully open position in order to, for example, add additional cargo into trunk compartment 5, and then quickly and easily resecure trunk lid 2 back in its original, partially-open position by quickly snapping ball stud 82 back into quick-release ball socket 88.

In another particularly preferred embodiment of the present invention and with reference to FIGS. 2 and 3, upper arm 18 of upper lid clamp assembly 12 is provided with vertical threaded hole 44' which allows ball socket 40 to be attached to the upper surface of upper arm 18 of upper lid clamp assembly 12 instead of being attached to middle portion 19. Ball socket 40 can be moved to this alternate location, which is particularly suitable for vehicles having hatchback-type rear trunk lids, by unscrewing threaded stud 42 from threaded hold 44, and screwing threaded stud 42 into vertical threaded hole 44' in upper arm 18. This modification can be done quickly and easily by using a pliers or open-end wrench to engage the outer surface of ball socket 40, which is preferably provided with a standard-sized hex configuration. This added feature of being able to secure ball socket 40 to either upper arm 18 or middle portion 19 of upper lid clamp assembly 12 allows hold-open device 10 of the present invention to be used on an extremely wide variety of vehicles having differently configured lid panels.

In another particularly preferred embodiment of the present invention and with reference to FIGS. 2 and 4, vertical flange 80 of upper arm 60 of lower body clamp assembly 14 is provided with vertical threaded hole 84' into which threaded stud 86 of ball stud 82 can be secured to allow ball stud 82 to project vertically rather than horizontally. This modification can also be done quickly and easily by using a pliers or open-end wrench to engage the outer surface of ball stud 82, which is preferably provided with a standard-sized hex configuration. This added feature of being able to project ball stud 82 either horizontally or vertically from upper arm 60 of lower body clamp assembly 14 allows hold-open device 10 of the present invention to be used on an even wider variety of vehicles having differently configured lid panels.

In yet another particularly preferred embodiment of the present invention and with reference to FIG. 5, there is shown lower body clamp assembly generally indicated as 90 that is particularly adapted to be attached to rain gutter 8 of side fender 6 or rear panel 7 of vehicle 1. In FIG. 5, lower body clamp assembly 90 generally includes upper arm 91, middle portion 92, and lower arm 93. Upper arm 91 has projecting downwardly therefrom upper foot 94, which is provided with pad 95, that is preferably of a length sufficient to accommodate gasket 9 found on most vehicle rain gutters. Upper arm 91 also includes horizontal threaded hole 96, and preferably also vertical threaded hole 97, into either of which threaded stud 98 of ball stud 99 is secured. In use, ball stud 99 receives quick-release ball socket 88 which is attached to the lower end of linkage member 16.

Still referring to FIG. 5, lower arm 93 of lower body clamp 90 includes threaded hole 100 through which threaded stud 101 passes. Lower foot 102, which preferably has pad 103 attached to its upper surface, is attached to the upper end of threaded stud 101 while handle 104 is attached to the lower end of threaded stud 101.

Lower body clamp assembly 90 is attached to rain gutter 8 of side fender 6 or rear panel 7 in the same manner as previously-described lower body clamp assembly 14. In most circumstances, rain gutter 8 is squeezed between upper foot 94 and lower foot 102 with sufficient force to prevent clamp assembly from rotating or otherwise moving. However, in the particularly preferred embodiment shown in FIG. 5, middle portion 92 of clamp assembly 90 is provided with threaded hole 105, threaded stud 106, handle 107, and middle foot 108. When threaded stud 106 is advanced into middle portion 92 by turning handle 107 clockwise, middle foot 108 engages the side of rain gutter 8 and provides added stability and totally prevents clamp assembly 90 from rotating or otherwise moving.

In yet another particularly preferred embodiment of the present invention and with reference to FIG. 6, there is shown clamp assembly generally indicated as 110 that can be attached to either the lid or body portion of a vehicle. In FIG. 6, clamp assembly 110 generally includes upper clamp jaw 111, lower clamp jaw 112, and clamp jaw pivot point 113 where upper jaw 111 and lower jaw 112 are attached to one another in a ball-and-socket rotating connection. Upper clamp jaw 111 includes upper arm 114 that terminates with upper foot 115 while lower clamp jaw 112 includes lower arm 116 that terminates with lower foot 117. Lower clamp jaw 112 includes upper arm 118, threaded hole 119, threaded stud 120, handle 121 attached to the left end of threaded stud 120, and foot 122 attached to the right end of threaded stud 120.

Clamp assembly 110 is attached to either the lid or body portion of a vehicle as follows: first, handle 121 is rotated counterclockwise, which backs threaded stud 120 out of threaded hole 119 and moves foot 122 away from upper clamp jaw 111, which in turn allows upper clamp jaw 111 and lower clamp jaw 112 to rotate about clamp jaw pivot point 113 and be spread apart a distance sufficient enough to allow the lid or the body portion of the vehicle to pass between upper foot 115 of upper arm 114 and lower foot 117 of lower arm 116. Next, upper foot 115 and lower foot 117 are positioned with the lid or body portion of the vehicle thereinbetween. Finally, handle 121 is rotated clockwise, which advances threaded stud 120 into threaded hole 119 such that foot 122 engages upper clamp jaw 111 and causes upper clamp jaw 111 and lower clamp jaw 112 to rotate about clamp jaw pivot point 113, which causes the lid or vehicle body portion to be squeezed between upper foot 115 and lower foot 117 to tightly secure clamp assembly 110 in place.

Figure 7:
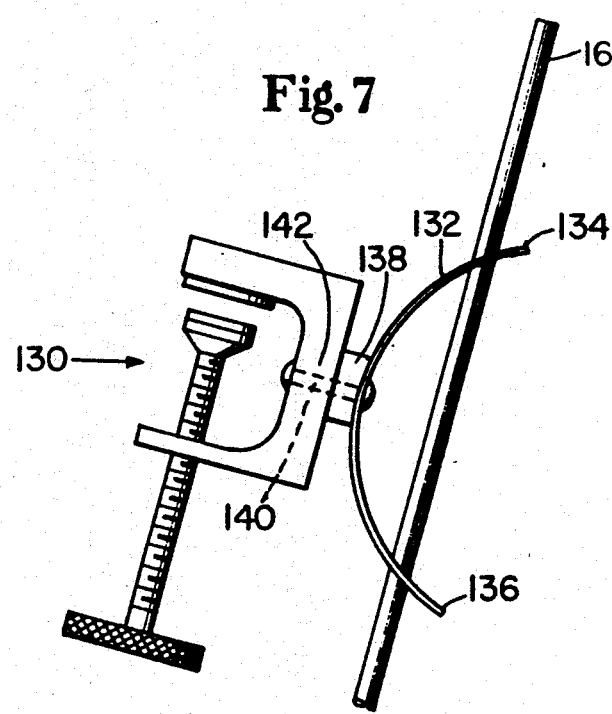
FIG. 7 is a side elevation view of another preferred embodiment of an upper lid clamp assembly of the present invention.

FIG. 7 shows another preferred upper lid clamp assembly generally indicated as 130, and an alternate means for pivotally and slidably attaching upper lid clamp assembly 130 to linkage member 16. Upper lid clamp assembly 130 is essentially identical to upper lid clamp assembly 12 described earlier herein and therefore a detailed description is believed to be unnecessary. The alternate means for pivotally and slidably attaching upper lid clamp assembly 130 to linkage member 16 generally includes spring clamp 132 having upper end 134 and lower end 136, rubber mount 138, and rivet 140 (or other fastener equivalent) which attaches spring clamp 132 and rubber mount 138 to middle portion 142 of upper lid clamp assembly 130. Preferably, either spring clamp 132 is free to rotate on rivet 140, or spring clamp 132 is fixed to rubber mount 138 and both are allowed to rotate on rivet 140. In the alternative, spring clamp 132 is fixed to rubber mount 138 and rubber mount 138 is fixed to middle portion 142 with, for example, an epoxy adhesive in which case the flexibility of rubber mount 138 provides the ability to rotate spring clamp 132 with respect to clamp assembly 130.

Spring clamp 132, which is preferably made of spring steel or plastic, is biased toward a planar configuration. Linkage member 16 can be easily slid through holes in ends 134 and 136 of spring clamp 132 simply by squeezing ends 134 and 136 toward one another, which relieves the pressure on linkage member 16, and sliding linkage member 16 through the holes to its desired position, and then releasing ends 134 and 136 to allow spring clamp 132 to again frictionally engage linkage member 16.

Figure 8:
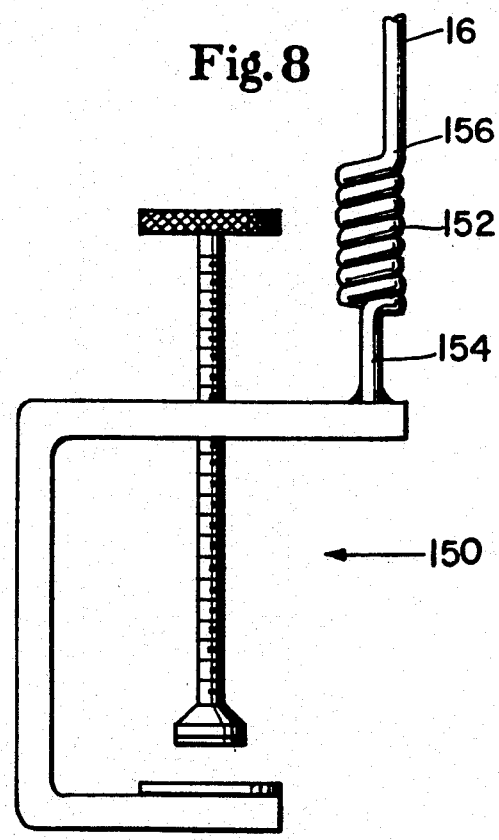
FIG. 8 is a side elevation view of another preferred embodiment of a lower body clamp assembly of the present invention.

FIG. 8 shows another preferred lower body clamp assembly generally indicated as 150, and an alternate means for pivotally attaching lower body clamp assembly 150 to linkage member 16. Lower body clamp assembly 150 is essentially identical to lower body clamp assembly 14 described earlier herein and therefore a detailed description is believed to be unnecessary. The alternative means for pivotally attaching lower body clamp assembly 150 to linkage member 16 generally comprises spring 152 whose lower end 154 is attached, e.g. welded, to upper arm 156 of clamp 150, and whose upper end 156 is attached, e.g. welded, to the lower end of linkage member 16.

In all embodiments, the lower clamps 14, 90, 110, and 150 are all respectively provided with a small upper foot 74, 94, and 115, for instance, and their attached foot pads are likewise small. In this regard, "small" means of an overall lateral dimension less than that of the spacing between the upright legs 8' and 8" of the U-shape of the rain gutter 8, as shown in FIGS. 1, 5, and 6. The lower clamps 14, 90, 110, and 150 are therefore smaller in width than the spacing between the upright legs 8' and 8" of the rain gutter 8; so the respective feet shown can be received between those legs and can be clamped directly onto the horizontal bottom panel 8'" of the rain gutter 8 and directly into clamping relationship with the opposed lower foot 66, 102, and 117, respectively, of each lower clamp assembly shown.

To further facilitate the lower attachment, the quick disconnect of ball stud 82, ball socket 88, and sleeve 89 is shown to include a compression spring 157 which bears against a flange 158 on the ball socket 88 and against a shoulder 159 on the sleeve 89. Also, the sleeve 89 has a slot 160 which receives the ball neck 161 but which captures the ball 162 until the sleeve is retracted against the spring 157 and free of the neck 161.

It will be understood that in the disclosed invention there is a complete assembly of the vehicle with the trunk gutter 8 and the holder 10. An unshown, but well-known, balance spring is applied to the trunk lid 2 to urge the lid 2 open. Also, in transit, the lid 2 will be subjected to bouncing forces urging the lid 2 up and down, and the holder 10 prevents both up and down movement of the lid 2.

Recognizing that the lateral edges of lid 2 are only planar and extend over the seal 9, and thus beyond, the gutter leg 8' to terminate adjacent the leg 8", it is to be noticed that the flange 80 of the clamp 14 positions the ball stud 82 toward the outside of the trunk compartment 5 and that is to be adjacent the outside leg 8" of the gutter 8. Accordingly, the assembly 14 is arranged to penetrate the gutter 8 and to also present its ball stud 82 closest to an alignment vertically under the margin of the lid 2 and the ball stud 40 and 42 when the clamp assembly 12 is attached; FIG. 2 showing it only unattached. The rod 16 can therefore extend along a vertical plane in the fore-and-aft direction of the vehicle when the holder 10 is attached at either side of the vehicle where the gutter 8 is disposed. That positions the holder 10 outside the space of the compartment 5 and in the optimum position for the security of the clamp 12 on the margin of the lid 2, and it avoids undesirable force components from forces axially of said rod and thereby being lateral forces otherwise actionable through an otherwise angled rod 16 and onto the clamp 12 to possible dislodge clamp 12. FIG. 1 shows this vertical alignment of the rod 16 laterally of the vehicle 1.

Accordingly, the clamp 14 has its arm 60 terminating in the free end 80 which is to the side of stud 72 opposite from middle portion 62. Also, flange 80 and ball stud 82 are disposed offset from the plane of arm 60 only in the direction away from the clamp arm 64, to thereby have the flange 80 and ball stud 82 clear of the vehicle body 3, in FIGS. 1 and 2. Also, the attachment of the rod 16 to the clamp 14 is arranged with the ball-stud 82 trapped in the socket 88 to preclude any up or down motion of the rod 16 relative to the ball-stud 82 or the clamp 14. This provides a firm and stable attachment such that the rod 14 cannot slip or otherwise move up or down relative to the clamp 14. Then only the screw 54 needs to be tightened to secure rod 16, and the rod 16 is fixedly bottomed in its attachment with clamp 14.

While several particularly preferred embodiments of the present invention have been described and illustrated, it should now be apparent to those skilled in the art that various changes and modifications can be made thereto without departing from the spirit and scope of the present invention. In addition, although the preceding description of the present invention is generally addressed to securing an automobile's trunk lid in a partly-open position, it is to be understood that the invention can also be applied with equal facility to securing a wide variety of other types of lids on other types of vehicles in a partly-open position. Accordingly, the following claims are intended to embrace such changes, modifications, and areas of application that are within the spirit and scope of this invention.

What is claimed is:

1. A holder for a vehicle trunk lid which has lateral margin edges and with the vehicle having a trunk bottom panel and a compartment and a U-shaped rain gutter bordering said compartment and extending around at least a portion of said compartment and thereby bordering at least said portion of the upper periphery of said compartment, and wherein said U-shape has two upwardly extending and spaced-apart legs and a middle span extending in the space between said legs, a first clamp attachable to said trunk lid, a second clamp attachable to said rain gutter, a rigid rod attached to both said clamps and extending therebetween for holding said trunk lid in a selected open position, said second clamp including a clamping foot which is narrow and therefore of a size no wider than the spacing between said U-shaped gutter legs and thereby being clampable directly onto said middle span, and means for attaching said rod to said first and second clamps and with said rod being positioned completely outside said compartment and thereby extending only higher than the elevation of said rain gutter.

2. The holder as claimed in claim 1, wherein said second clamp is C-shaped and includes two arms and a middle portion extending between said arms, a screw threadedly extending through one of said arms and parallel to said middle portion, and said one of said arms including a length disposed to the side of said screw opposite from said middle portion, and said means for the attachment of said rod to said second clamp being on said length and positioned adjacent said gutter.

3. The holder as claimed in claim 1, wherein said means for the attachment of said rod to said second clamp is arranged to have said rod extend at an elevation only higher than an elevation of said clamping foot, and with said rod being completely outside said compartment.

4. The holder as claimed in claim 1, wherein the attachment of said rod at said second clamp fixedly bottoms said rod at said clamp by being arranged to completely restrain said rod from any motion along its longitudinal axis and relative to said clamp.

5. The holder as claimed in claim 1, wherein said rod has a longitudinal axis, and said means for the attachment of said rod at said second clamp fixedly bottoms said rod on said means by being arranged to have the lower end of said rod in abutment with said means in the direction of said longitudinal axis of said rod.

6. The holder as claimed in claim 4, wherein said attachment at said second clamp includes a spring-loaded sleeve-and-ball connection for quick attachment and release.

7. A combined holder and vehicle having a trunk lid and a trunk compartment having a bottom panel and being upwardly open and bordered by a rain gutter extending along the top edge of said compartment, said gutter being U-shaped in cross-section and having two upstanding legs spaced apart and having a bottom panel extending in the space between said legs, said holder comprising a first clamp attachable to said lid, a second clamp being of a small size for extending into said space between said legs and to said bottom panel and being clampable onto said bottom panel, a rigid rod, and means for attaching said rod to each of said clamps and with said rod positioned to extend uprightly between said clamps and clear of contact with said trunk bottom panel and with said rod positioned to extend only at and higher than an elevation of said second clamp and with said rod positioned completely outside said compartment and thereby extending only at an elevation higher than said compartment.

8. The combined holder and vehicle as claimed in claim 7, including an articular joint included in said means of attachment between said rod and both said clamps, and said trunk lid having a marginal edge extending vertically above said gutter and with said first clamp attached to said marginal edge, and said joints being in vertical alignment to each other to thereby have said rod extend along a vertical plane for-and-aft of said vehicle.

9. The holder as claimed in claim 7, wherein said second clamp is C-shaped and includes two arms and a middle portion extending between said arms, a screw threadedly extending through one of said arms and parallel to said middle portion, and said one of said arms including a length disposed to the side of said screw opposite from said middle portion, and said means for attachment of said rod to said clamp being on said length and positioned adjacent said gutter.

10. The holder as claimed in claim 7, wherein said rod has a lower surface, and said means having a surface facing said rod surface and with said surfaces being in mutual abutment with each other for upwardly supporting said rod on said means.

11. The holder as claimed in claim 7, including a spring-loaded sleeve and ball connection included in one of the attachments of said rod to said clamps, for quick attachment and release of said connection.

* * * * *